(12) United States Patent
Lin

(10) Patent No.: US 11,316,422 B1
(45) Date of Patent: Apr. 26, 2022

(54) STATION-TO-STATION SYNCHRONOUS AND INTERLEAVED PHASE SYSTEM FOR MULTIPLE DC/AC POWER SUPPLIES CONNECTED IN PARALLEL

(71) Applicant: Chyng Hong Electronic Co., Ltd., Taichung (TW)

(72) Inventor: Mu-Chun Lin, Taichung (TW)

(73) Assignee: CHYNG HONG ELECTRONIC CO., LTD., Taichung (TW)

( * ) Notice: Subject to any disclaimer, the term of this patent is extended or adjusted under 35 U.S.C. 154(b) by 0 days.

(21) Appl. No.: 17/236,984

(22) Filed: Apr. 21, 2021

(51) Int. Cl.
*H02M 1/14* (2006.01)
*H02M 7/44* (2006.01)

(52) U.S. Cl.
CPC .............. *H02M 1/14* (2013.01); *H02M 7/44* (2013.01)

(58) Field of Classification Search
CPC .................... H02M 1/14; H02M 7/44
See application file for complete search history.

(56) References Cited

U.S. PATENT DOCUMENTS

| | | | |
|---|---|---|---|
| 9,287,769 B1 | 3/2016 | Lin | |
| 9,621,066 B2* | 4/2017 | Lin | H02M 7/003 |
| 9,787,189 B1 | 10/2017 | Lin | |
| 2005/0128667 A1* | 6/2005 | Okada | H02J 1/08 |
| | | | 361/64 |
| 2016/0315468 A1* | 10/2016 | Shim | H02J 3/32 |
| 2019/0013748 A1* | 1/2019 | Barrenscheen | H02P 6/15 |

* cited by examiner

*Primary Examiner* — Jared Fureman
*Assistant Examiner* — Duc M Pham
(74) *Attorney, Agent, or Firm* — Sinorica LLC

(57) ABSTRACT

A station-to-station synchronous and interleaved phase system for multiple DC or AC power supplies connected in parallel includes a master and a plurality of slaves. The master and the slaves each includes a time base selector, a time base generator, a station-to-station synchronization and interleaved phase controller, a local interleaved phase controller and multiple sets of switching circuits, so that the switching circuits are controlled by the local interleaved phase controller to form interleaved phases, and the time base selector and the station-to-station synchronization and interleaved phase controller further control the station-to-station phases between the master and the slaves, and further generate synchronization and interleaved phases between the master and the slaves. In addition to the advantages of increasing the equivalent operating frequency, it can reduce the rate of ripples and increase the response speed.

6 Claims, 3 Drawing Sheets

STATION-TO-STATION SYNCHRONOUS AND INTERLEAVED PHASE SYSTEM FOR MULTIPLE DC/AC POWER SUPPLIES CONNECTED IN PARALLEL

FIELD OF THE INVENTION

The present invention relates to a power supply, and more particularly to a station-to-station synchronous and interleaved phase system for multiple DC/AC power supplies connected in parallel.

BACKGROUND OF THE INVENTION

With the continuous development and breakthrough of electronic technology, AC/DC power supplies are widely used. AC/DC power supplies are categorized into linear AC/DC power supplies and switching AC/DC power supplies according to their working principles and design structures. The basic structure of a linear AC/DC power supply includes a linear amplifier with the first quadrant being DC and the first and fourth quadrants being AC and a bipolar DC power supply. If it involves bidirectional DC, they are the first and second quadrants. Linear amplifiers are generally categorized into A, B, AB, etc., and use the linear region of power components. The basic working quadrant of the switching AC/DC power supply is the same as that of the linear AC/DC power supply, except that the amplifier adopts a D amplifier. The D amplifier as a switching working mode has the advantage of high efficiency. With the advancement of wide-bandgap semiconductors (WBG) and the popularity of silicon carbide (SiC) and gallium nitride (GaN) power components, the switching operation has been further improved. The main difference between a linear amplifier and a switching amplifier is that the former uses the linear region of the power components, and the latter is only a simple switching operation. Because the linear amplifier does not involve a switching operation, it is completely different from the switching amplifier that is composed of multiple amplifiers.

Since the switching amplifier involves a switching operation, it must have a frequency relationship, and the power component determines the switching frequency. For example, the switching frequency of the insulated gate bipolar transistor (IGBT) is mostly less than 20 KHz. The switching frequency of MOSFET is about 110-150 KHz. The switching frequency of SiC MOSFET is more than 100 KHz. It can be seen that the differences in the working frequencies of the above-mentioned components are dependent on the characteristics of the material itself. The switching operation must involve frequency. Due to the limited working frequency of power components, the interleaved phase method can be adopted to solve the above problems, so that the total output frequency is the sum of the superposition of the switching frequencies of multiple switching amplifiers that are connected in parallel. In addition, when multiple switching amplifiers are connected in parallel, it needs to pay attention to the phase relationship for the switching frequency in order to establish a complete frequency domain and time domain relationship. If the switching frequency can be synchronized, electromagnetic interference (EMI) filtering can be controlled better. When multiple switching power supplies work at the same potential, the synchronization or frequency multiplication and out-of-phase relationship are the same purpose. For multiple switching power supplies that are connected in parallel, it is necessary to build a phase relationship.

In addition, if the switching frequency is higher, the output current waveform is smoother, which in turn reduces the rate of ripples and increases the response speed. The way to reduce the rate of ripples can use interleaved phase technology. When the phases are not interleaved, the rate of ripples is 1. After the phases are interleaved, the rate of ripples is 1/N, and N is 2-X. For example, U.S. Utility Pat. No. 9,787,189 titled "MULTI-PHASE DC POWER SUPPLY WITH SWITCHING FREQUENCY UP TO 1 MHZ" owned by the inventor. That is, 9 phases are interleaved to reduce the rate of ripples and the switching frequency may be of more than 1 MHz.

In addition, in order to meet the industry's testing requirements for high-power industrial equipment or various products, a high-power DC power supply system will inevitably be needed. If a single AC/DC power supply is used to achieve high-power requirements, the cost is too high. Through multiple AC/DC power supplies to be connected in parallel and synchronized, high power and high frequency requirements are achieved, for example, U.S. Utility Pat. No. 9,287,769 titled "MULTIPLE SYNCHRONOUS CIRCUITS OF SWITCHING AC/DC POWER SUPPLY" and U.S. Utility Pat. No. 9,621,066 titled "MASTER-SLAVE CONTROL SYSTEM OF AC/DC POWER SUPPLY" filed by the inventor. That is, in a master-slave control mode, multiple AC/DC power supplies are connected in parallel and synchronized to obtain high output power for high-power loads.

However, although multiple AC/DC power supplies can be connected in parallel to obtain the maximum output power, the maximum of the total output ripples of multiple AC/DC power supplies as a whole can be the superposition of the maximum of the output ripples of the switching frequency of each AC/DC power supply. Therefore, the inventor of this application deems it is necessary to effectively reduce the ripples after multiple AC/DC power supplies are connected in parallel, so the present invention is derived.

SUMMARY OF THE INVENTION

The primary object of the present invention is to provide a station-to-station synchronous and interleaved phase system for multiple DC/AC power supplies connected in parallel. Through the interleaved phases formed between the power supplies, the switching frequency of all the DC/AC power supplies connected in parallel is increased, the rate of ripples is reduced, and the response speed is increased.

In order to achieve the above object, the present invention provides a station-to-station synchronous and interleaved phase system for multiple DC/AC power supplies connected in parallel, comprising a master and a plurality of slaves. The master is a power supply configured to supply DC/AC power. The master has a port. The port is connected with a time base selector. A time base generator is connected to the time base selector and configured to generate a time base to the time base selector. The time base selector is further connected with a station-to-station synchronization and interleaved phase controller. The station-to-station synchronization and interleaved phase controller is further connected with a local interleaved phase controller. The local interleaved phase controller is further connected in parallel with three sets of switching circuits so that phases of the switching circuits are controlled by the local interleaved phase controller to form interleaved phases.

The slaves are power supplies configured to supply DC/AC power. Each slave has a port. The ports of the slaves are electrically connected to the port of the master through external cables. The port of each slave is connected with a time base selector for the time base selector to select the time base generated by the master. The time base selector is further connected with a station-to-station synchronization and interleaved phase controller. The station-to-station synchronization and interleaved phase controller is further connected with a local interleaved phase controller. The local interleaved phase controller is further connected in parallel with three sets of switching circuits so that phases of the switching circuits are controlled by the local interleaved phase controller to form interleaved phases.

Thereby, the master and the slaves control the phases between the master and the slaves through the respective station-to-station synchronization and interleaved phase controllers and further generate the interleaved phases between the master and the slaves.

DETAILED DESCRIPTION OF THE PREFERRED EMBODIMENTS

Embodiments of the present invention will now be described, by way of example only, with reference to the accompanying drawings.

Figure 1:
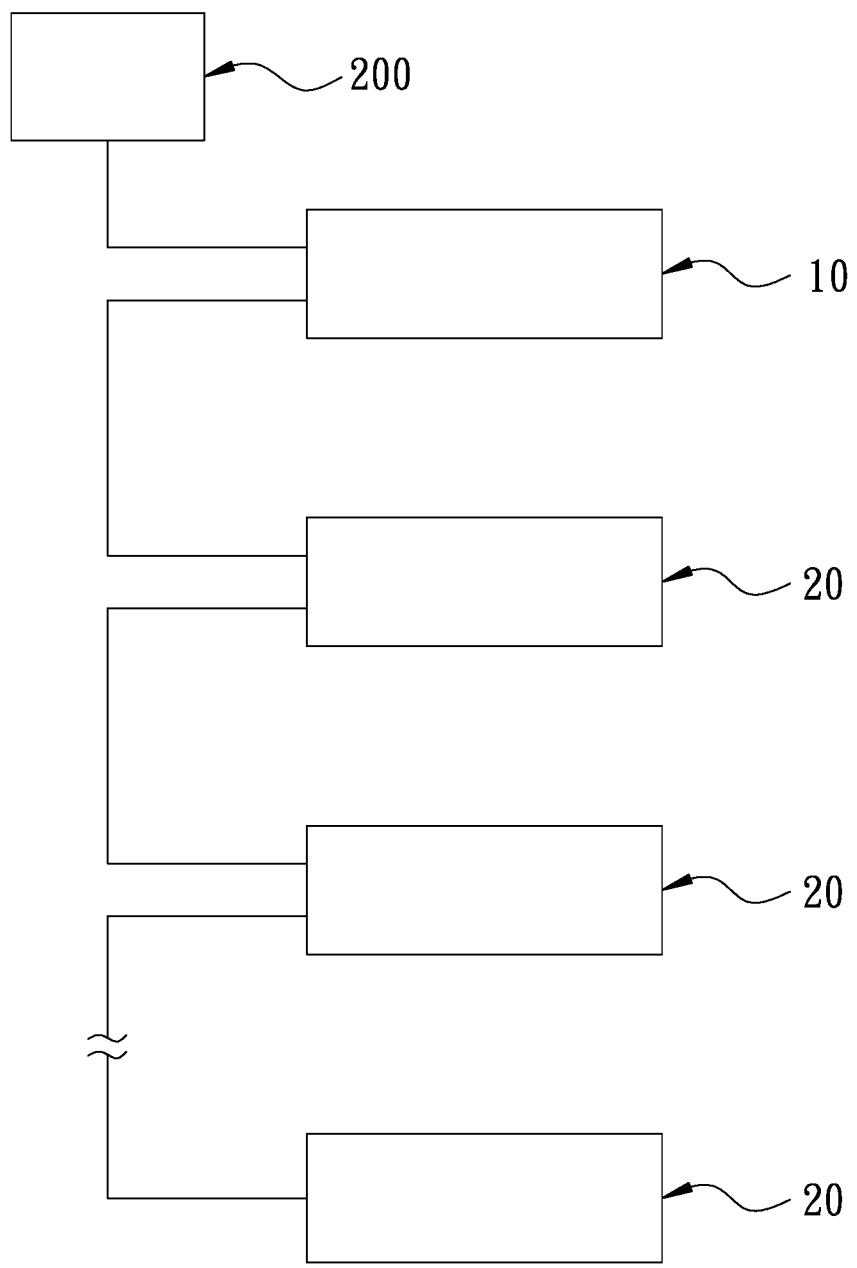
FIG. 1 is a schematic view showing a master-slave control of multiple DC/AC power supplies connected in parallel according to a first embodiment of the present invention.
Figure 2:
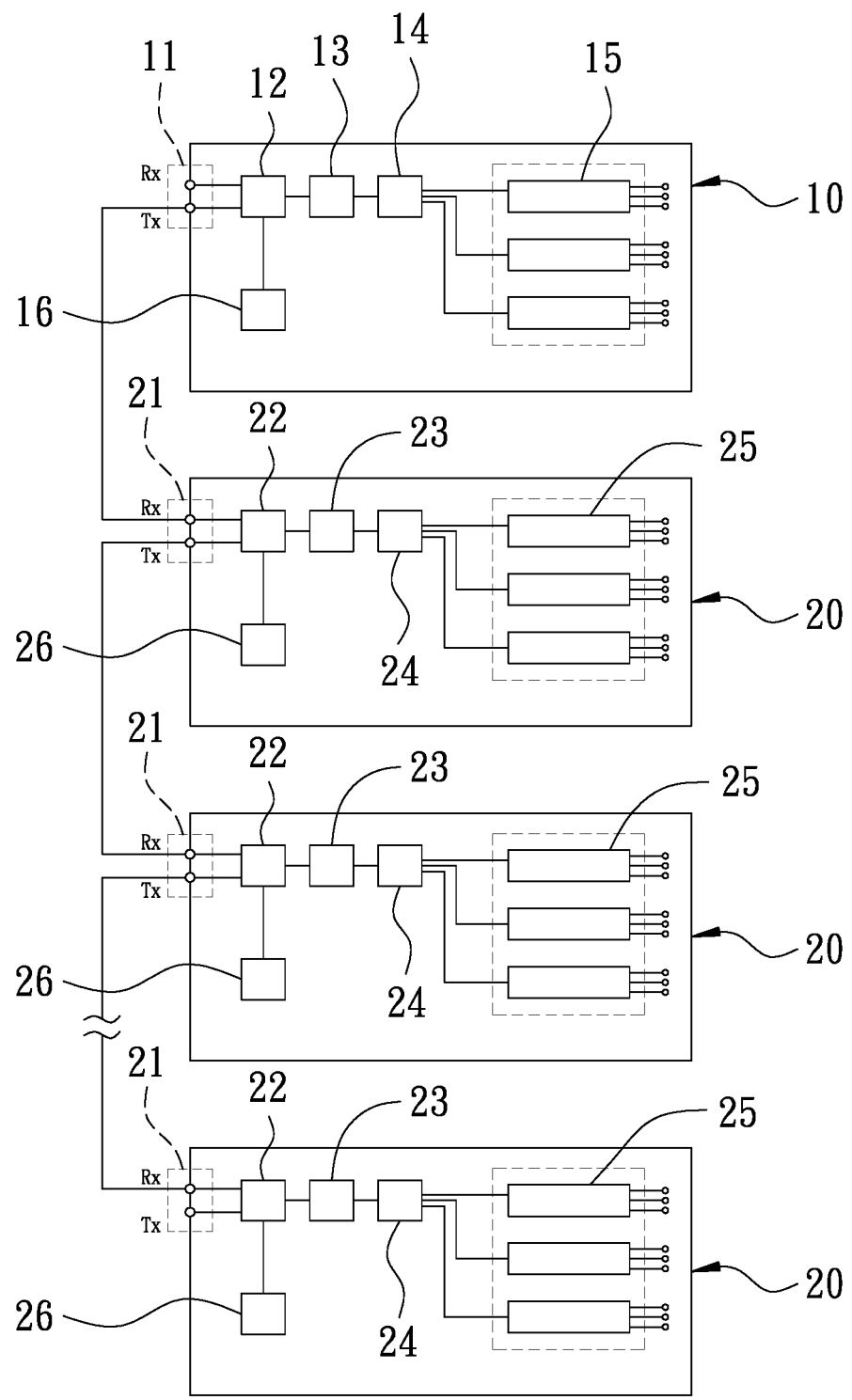
FIG. 2 is a block diagram according to the first embodiment of the present invention.

As shown in FIG. 1 and FIG. 2, the present discloses a station-to-station synchronous and interleaved phase system for multiple DC/AC power supplies connected in parallel, comprising a master 10 and a plurality of slaves 20.

The master 10 is a power supply configured to supply DC/AC power. The master 10 has a port 11. The port 11 is one of ports used for optical fiber, coaxial cable or local area network, but not limited thereto. The port 11 includes an input port RX and an output port TX. The master 10 includes a time base selector 12. One end of the time base selector 12 is electrically connected to the port 11. The other end of the time base selector 12 is connected to a station-to-station synchronization and interleaved phase controller 13. The time base selector 12 is further connected to a time base generator 16, so that the time base selector 12 can select an external time base from the port 11 of the master 10 or the time base generated by the time base generator 16 inside the master 10. In this embodiment, the time base selector 12 selects the time base generated by the time base generator 16 inside the master 10. The station-to-station synchronization and interleaved phase controller 13 is further connected to a local interleaved phase controller 14. The local interleaved phase controller 14 is connected in parallel with three sets of 3-phase switching circuits 15. The switching circuits 15 can choose one of SiC, GaN, BJT, IGBT, or MOSFET, etc., but not limited thereto. In this embodiment, the switching frequency of the switching circuits 15 is about 112 kHz. The switching circuits 15 are connected in parallel, so that the phase sequence of the switching circuits 15 is subject to the interleaved phase effect of the local interleaved phase controller 14 to form 9 phases. In this embodiment, the master 10 is connected to a remote control unit 200 to remotely control the master 10. The remote control unit 200 may be a computer or a programmable controller.

The slaves 20 are power supplies configured to supply DC/AC power. Each slave 20 has a port 21. The port 21 is one of ports used for optical fiber, coaxial cable or local area network, but not limited thereto. The port 21 is a RJ45 port. The port 21 includes an input port RX and an output port TX. The ports 21 of the slaves 20 are electrically connected to the port 11 of the master 10 through external cables. Each slave 20 includes a time base selector 22 therein. One end of the time base selector 22 is electrically connected to the port 21. The other end of the time base selector 22 is connected to a station-to-station synchronization and interleaved phase controller 23. The time base selector 22 is further connected to a time base generator 26, so that the time base selector 22 can select an external time base from the port 21 of the slave 20 or the time base generated by the time base generator 26 inside the slave 20. In this embodiment, the time base selector 22 selects the time base generated by the time base generator 16 of the master 10, such that the time base of the slave 20 is also provided by the time base generator 16 of the master 10 to synchronize the slave 20 with the master 10. The station-to-station synchronization and interleaved phase controller 23 is further connected to a local interleaved phase controller 24. The local interleaved phase controller 24 is connected in parallel with three sets of 3-phase switching circuits 25. The switching circuits 25 can choose one of SiC, GaN, BJT, IGBT, or MOSFET, etc., but not limited thereto. In this embodiment, the switching frequency of the switching circuits 25 is about 112 kHz. The switching circuits 25 are connected in parallel, so that the phase sequence of the switching circuits 25 is subject to the interleaved phase effect of the local interleaved phase controller 24 to form 9 phases.

In order to further understand the structural features, the technical means and the expected effects of the present invention, the present invention is described in more detail.

When the master 10 is connected in parallel with the slaves 20, the time base selector 12 of the master 10 and the time base selectors 22 of the slaves 20 selectively receive the time base generated by the time base generator 16 of the master 10 for synchronization. Furthermore, through the station-to-station synchronization and interleaved phase controllers 13, 23, the master 10 generates a phase reference source. The slaves 20 each perform a phase shift with the time base of the master 10 to generate an interleaved phase effect between the master 10 and the slaves 20. In this embodiment, each DC power supply itself can generate a switching frequency of 9 phases and 1 MHz through the multi-phase interleaved phase effect formed by the three sets of 3-phase switching circuits. Therefore, if a master 10 is connected in parallel with a slave 20, a switching frequency of 18 phases and about 2 MHz can be generated. By analogy, if a master is connected in parallel with 9 slaves, a switching frequency of up to 90 phases and about 10 MHz can be generated.

Figure 3:
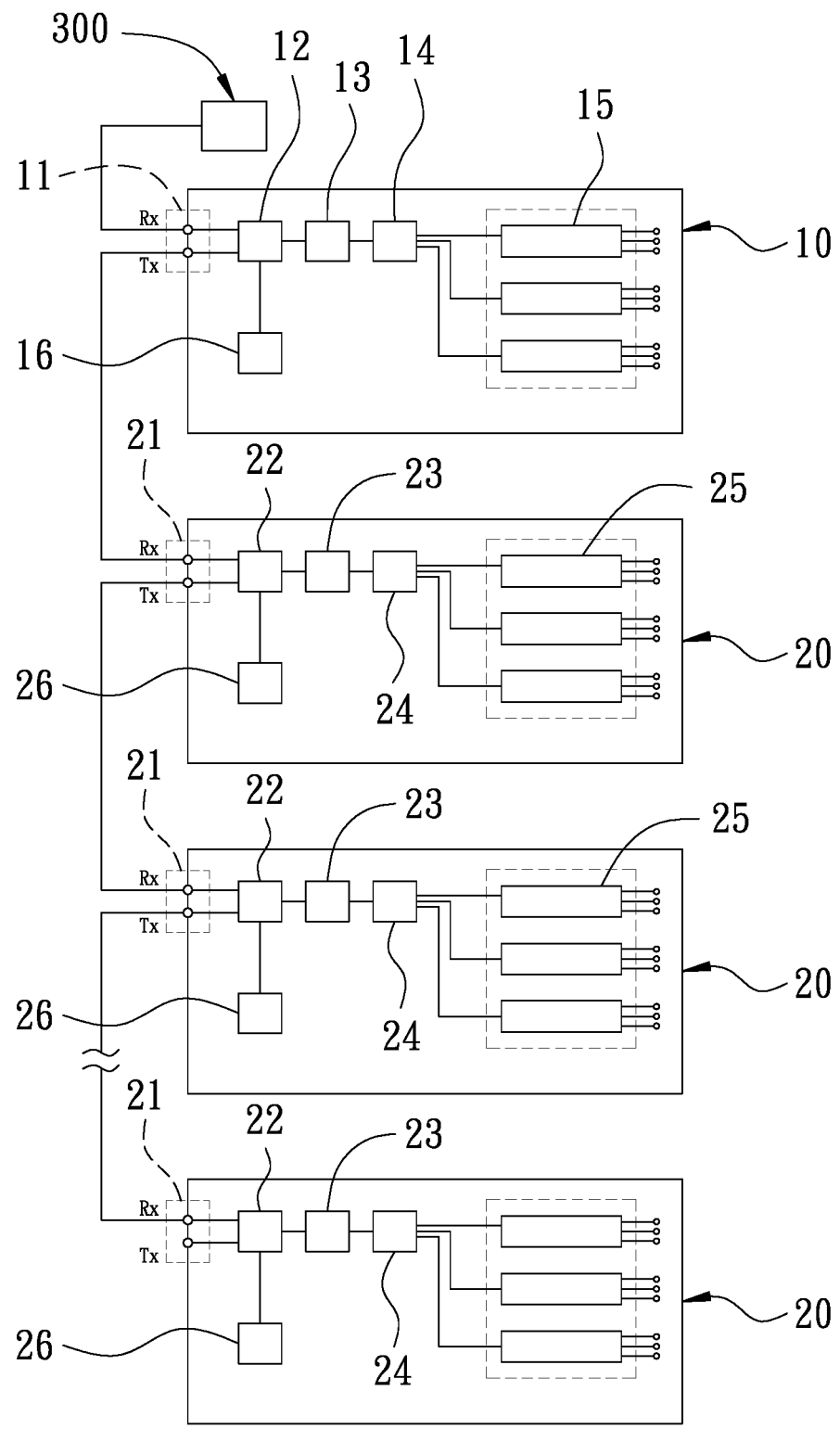
FIG. 3 is a block diagram according to a second embodiment of the present invention.

FIG. 3 illustrates another embodiment of the present invention. The time base of the master 10 is generated by an external time base generator 300. In this embodiment, the external time base generator 300 is a rubidium frequency standard oscillator. The time base generator 300 is connected to the input port of the master 10. The high frequency accuracy generated by the external time base generator 300 can provide the master 10 with a more precise and accurate time base frequency. In this way, the master 10 can have a higher time accuracy to meet the demand for higher accuracy.

It is worth mentioning that each slave 20 of the present invention has a time base generator 26 therein. Therefore, when the slave 20 is connected in parallel with the master 10, it is controlled by the master 10, and the time base of the master 10 is selected for the slave 20 to synchronize with the master 10. However, when the slave 20 is used alone and not in parallel with the master 10, the time base selector 22 of the slave 20 will select the time base generated by the internal time base generator 26 as the time base. The slave 20 has the same function as the master 10, which can be operated independently.

The features and the expected effects of the present invention are described below. In the present invention, through the time base generated by the time base generator of the master, the slaves and the master have the synchronous time base. With the synchronization of the time base, the phases and frequencies of the master and the slaves can be controlled, and the station-to-station synchronization and interleaved phase controllers can be further used to generate an interleaved phase effect. When the number of the slaves increases, the number of phases increases, the switching frequency is higher, the rate of output ripples is lower, the EMI noise decreases, and higher-quality DC output power can be obtained. In addition to the above-mentioned advantages of using interleaved phase technology to increase the equivalent operating frequency, the present invention has the following advantages:

1. A lower frequency is used to generate a power supply with a high frequency effect.
2. The response is faster and the current density is increased.
3. The pulsating current is reduced for the previous stage, thereby improving the durability of the previous stage.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A station-to-station synchronous and interleaved phase system for multiple DC/AC power supplies connected in parallel, comprising:
    a master (10), being a power supply configured to supply DC/AC power, the master (10) having a port (11), the port (11) being connected with a time base selector (12), a time base generator (16) being connected to the time base selector (12) and configured to generate a time base to the time base selector (12), the time base selector (12) being further connected with a station-to-station synchronization and interleaved phase controller (13), the station-to-station synchronization and interleaved phase controller (13) being further connected with a local interleaved phase controller (14), the local interleaved phase controller (14) being further connected in parallel with three sets of switching circuits (15) so that phases of the switching circuits (15) are controlled by the local interleaved phase controller (14) to form interleaved phases;
    a plurality of slaves (20), being power supplies configured to supply DC/AC power, each slave (20) having a port (21), the ports (21) of the slaves (20) being electrically connected to the port (11) of the master (10) through external cables, the port (21) of each slave (20) being connected with a time base selector (22) for the time base selector (22) to select the time base generated by the master (10), the time base selector (22) being further connected with a station-to-station synchronization and interleaved phase controller (23), the station-to-station synchronization and interleaved phase controller (23) being further connected with a local interleaved phase controller (24), the local interleaved phase controller (24) being further connected in parallel with three sets of switching circuits (25) so that phases of the switching circuits (25) are controlled by the local interleaved phase controller (24) to form interleaved phases;
    thereby, the master (10) and the slaves (20) controlling the phases between the master (10) and the slaves (20) through the respective station-to-station synchronization and interleaved phase controllers (13, 23) and further generating the interleaved phases between the master (10) and the slaves (20).

2. The station-to-station synchronous and interleaved phase system as claimed in claim 1, wherein the three sets of switching circuits (15, 25) of the master (10) and the slaves (20) each include 3-phase switching circuits.

3. The station-to-station synchronous and interleaved phase system as claimed in claim 1, wherein the slaves (20) each include a time base generator (26) therein.

4. The station-to-station synchronous and interleaved phase system as claimed in claim 1, wherein the time base selector (12) of the master (10) selects a time base of an external device.

5. The station-to-station synchronous and interleaved phase system as claimed in claim 4, wherein the external device is connected to an input end of the port (11) of the master (10) for selection of the time base selector (12).

6. The station-to-station synchronous and interleaved phase system as claimed in claim 4, wherein the external device is a rubidium frequency standard oscillator.

* * * * *